United States Patent
Nazari et al.

(10) Patent No.: US 9,513,823 B2
(45) Date of Patent: Dec. 6, 2016

(54) DATA MIGRATION

(75) Inventors: Siamak Nazari, Mountain View, CA (US); Ming Ma, Redmond, WA (US); Douglas James Cameron, Woodinville, WA (US); Jonathan Andrew McDowell, San Francisco, CA (US); Salil Gokhale, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1256 days.

(21) Appl. No.: 13/459,903

(22) Filed: Apr. 30, 2012

(65) Prior Publication Data

US 2013/0290627 A1    Oct. 31, 2013

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC .......... *G06F 3/0617* (2013.01); *G06F 3/0647* (2013.01); *G06F 3/0689* (2013.01)

(58) Field of Classification Search
CPC ..... G06F 3/0617; G06F 3/0689; G06F 3/0647
USPC ........................................................ 711/114
See application file for complete search history.

(56) References Cited

U.S. PATENT DOCUMENTS

| | | | |
|---|---|---|---|
| 6,510,491 B1 | 1/2003 | Franklin et al. | |
| 6,513,093 B1 | 1/2003 | Chen et al. | |
| 7,051,182 B2 | 5/2006 | Blumenau et al. | |
| 2002/0026558 A1* | 2/2002 | Reuter et al. | 711/114 |
| 2006/0259727 A1* | 11/2006 | Thomas et al. | 711/165 |
| 2008/0086480 A1 | 4/2008 | Srivastava et al. | |
| 2011/0016466 A1 | 1/2011 | Liu et al. | |

* cited by examiner

*Primary Examiner* — Charles Rones
*Assistant Examiner* — Sidney Li
(74) *Attorney, Agent, or Firm* — Patent Law Group LLP (57) ABSTRACT

A method for migrating data in a storage system includes generating a first set of logical disks (LDs), the LDs being mapped to physical storage space in the storage system, generating a temporary virtual volume (VV) mapped to the first set of LDs, generating a second set of LDs mapped to the temporary VV, and migrating data between the second set of LDs and a third set of LDs.

20 Claims, 9 Drawing Sheets

DATA MIGRATION

BACKGROUND

Data migration refers to the transfer of data from one storage system to another. Data migration may occur for a number of reasons, including load balancing and technology upgrade.

BRIEF DESCRIPTION OF THE DRAWINGS

In the drawings.

Use of the same reference numbers in different figures indicates similar or identical elements.

DETAILED DESCRIPTION

From time to time, data may need to be migrated one storage system to another. Current online (non-disruptive) data migration solutions either duplicate migration capabilities already embedded in the storage systems or accept the limitations of those capabilities. The result is often additional software or SAN based migration equipment are purchased, installed, and managed.

Figure 1:
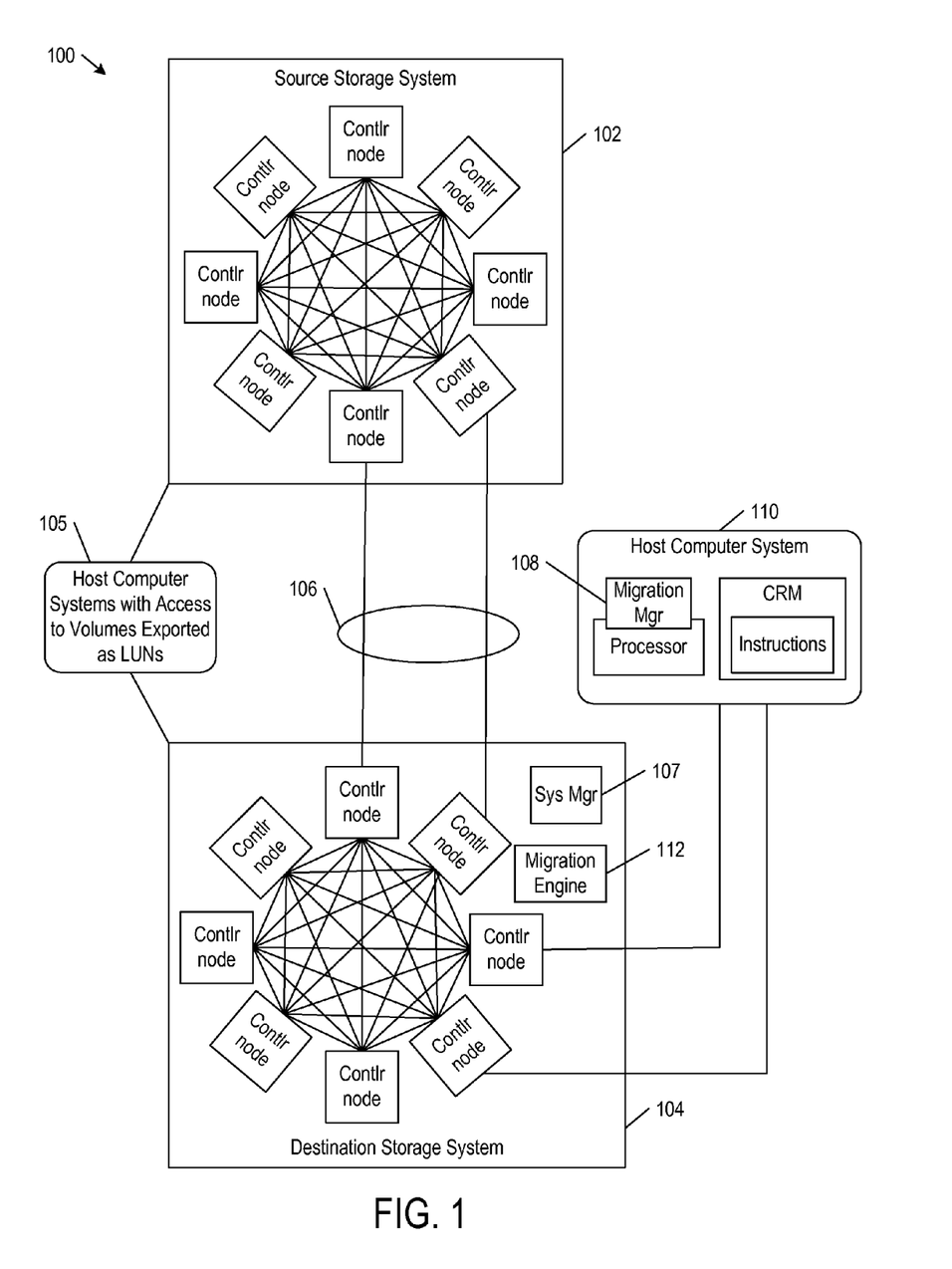
FIG. 1 is block diagram showing of a storage federation in one example of the present disclosure.

FIG. 1 is block diagram showing a storage federation 100 in one example of the present disclosure. Storage federation 100 includes a source storage system 102 and a destination storage system 104 coupled by two links 106.

Destination storage system 104 has a virtual volume (VV) layer to create external volumes presented to host computer systems 105, and a logical disk (LD) layer to implement RAID functionality over the raw storage in the system's physical drives (PDs). A system manager 107 allows users to create VVs, which are then exported and made visible to hosts as logical unit numbers (LUNs).

Destination storage system 104 includes a low-level migration engine 112, also known as the region mover, at the LD level that copies and mirrors data between sets of LDs mapped to physical disks (PDs). LD mirroring duplicates any host writes to both locations, ensuring data consistency. In one example, a migration manager 108 on a host computer system 110 uses migration engine 112 in a method to migrate volumes from source storage system 102 to destination storage system 104. In another example, migration manager 108 uses migration engine 112 in methods to convert a fully-provisioned VV (FPVV) on storage system 104 to a thinly-provisioned VV (TPVV) and vice versa. Migration manager 108 may be implemented with executable instructions for a processor in host computer system 110. The executable instructions may be stored in a non-transitory computer readable medium, such as a hard disk drive, a solid state drive, or another type of nonvolatile memory. Host computer system 110 is coupled to destination storage system 104.

Destination storage system 104 includes a full mesh backplane that joins multiple controller nodes to form a cache-coherent cluster. Controller nodes are paired and each pair is connected to dual-ported drive chassis (or drive cages) owned by that pair. In addition, each controller node has one or more paths to hosts. The clustering of controller nodes enables data storage system 104 to present to hosts a single, highly available, high-performance storage system. Hosts can access VV s over any host-connected port even if the PDs for that data are connected to a different controller node.

Figure 2:
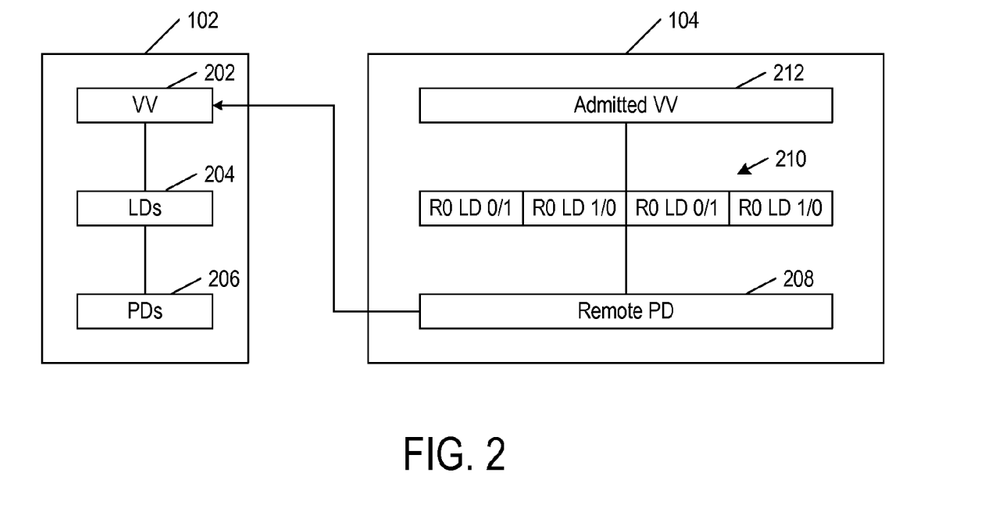
FIG. 2 is a block diagram of volumes presented by a source storage system and a destination storage system of FIG. 1 in one example of the present disclosure.

FIG. 2 is a block diagram of volumes presented by source storage system 102 and destination storage system 104 in one example of the present disclosure. Source storage system 102 has a volume 202 exported to host systems, including destination storage system 104. In one example, volume 202 is a VV mapped to a set of LDs 204, which are mapped a number of PDs 206.

On destination storage system 104, system manager 107 admits VV 202 as a type of remote PD called a physical disk virtual volume (PDVV) 208. In other words, system manager 107 creates a data structure that presents VV 202 as a PD to the LD layer on destination storage system 104 so that LDs can map to PDVV 208. System manager 107 then creates a set of RAID 0 (R0) LDs 210 on PDVV 208, and creates an admitted VV 212 on R0 LDs 210 so host systems coupled to destination storage system 104 can access VV 202 on source storage system 102. R0 LDs 210 are assigned to a set of node pairs to distribute workload among the primary nodes and allow a backup node to take over when primary node is offline. The primary and backup nodes in the node pairs are those in communication with source system 102 (e.g., nodes 0 and 1). R0 LDs 210 are RAID level 0 as they are mapped to a single PDVV 208. Admitted VV 212 is similar to a fully-provisioned VV except it has no data in destination storage system 104 and cannot be tuned (change layout of a VV), grown, setvv'ed (modify a VV to use a new name, to change CPG, set allocation warnings, or use new policies), exported, or snapped.

From time to time, data may need to be migrated from source storage system 102 to destination storage system 104. The present disclosure enables reuse of destination storage system 104's migration engine 112 while allowing fully virtualized destinations, thus eliminating the need for redundant migration capabilities. Any virtualized destination can be chosen by mapping a set of LDs temporarily to a new VV space. LD migration is then performed, after which the original VV is redirected to the newly populated VV space.

Figure 3:
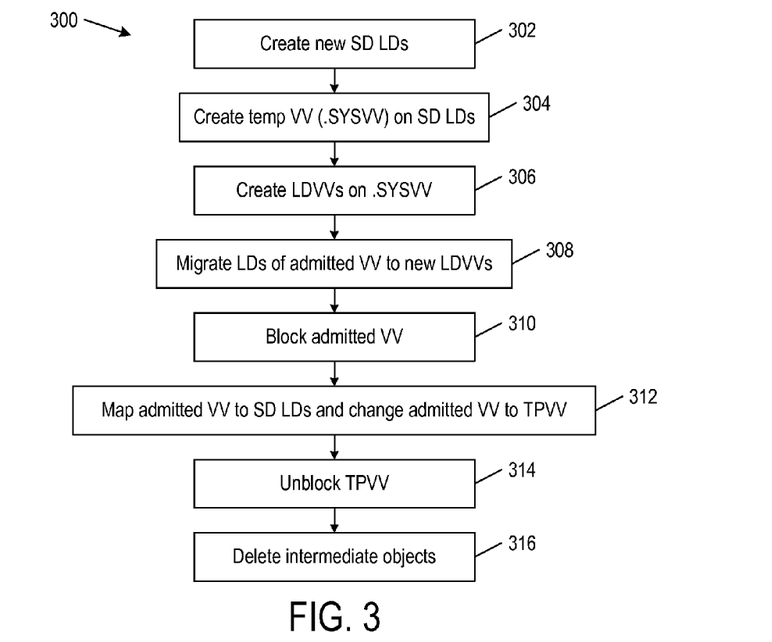
FIG. 3 is a flowchart of a method for migrating a volume from the source storage system to the destination storage system of FIG. 2 while the volume remains online in one example of the present disclosure.

FIG. 3 is a flowchart of a method 300 for migrating a volume from source storage system 102 (FIG. 1) to destination storage system 104 (FIG. 1) while the volume remains online in one example of the present disclosure. Note that the volume is considered to remain online when its unique identifiers (e.g., WWN and LUN number) do not change, and host access to the volume is not blocked for more than one minute. In one example, method 300 is implemented by a migration manger 108 (FIG. 1) located on a host computer system 110 (FIG. 1) coupled to destination storage system 104. In another example, migration manager 108 may be located on destination storage system 104.

Figure 4:
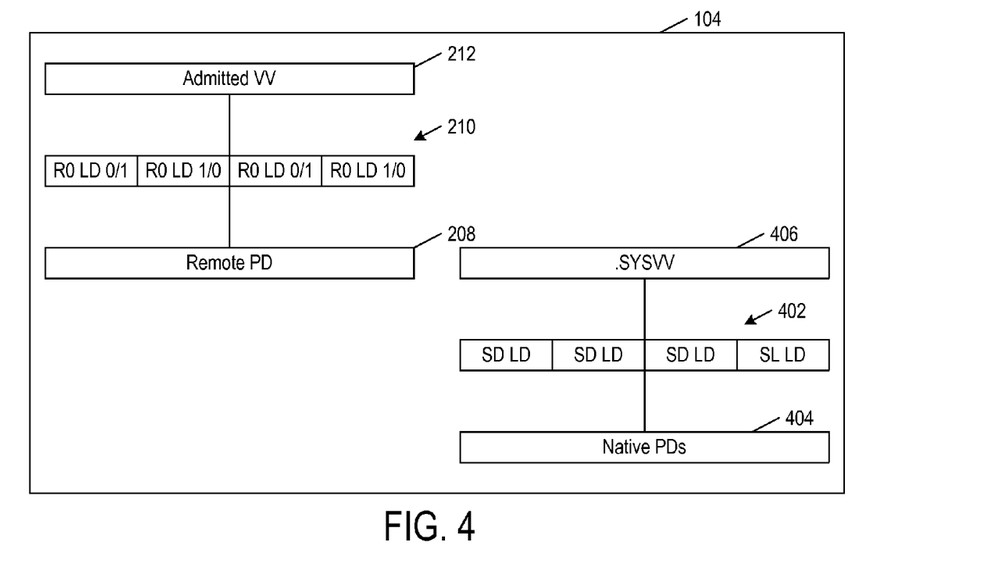
FIGS. 4, 5, and 6 illustrate the actions in the method in FIG. 3 in one example of the present disclosure.
Figure 5:
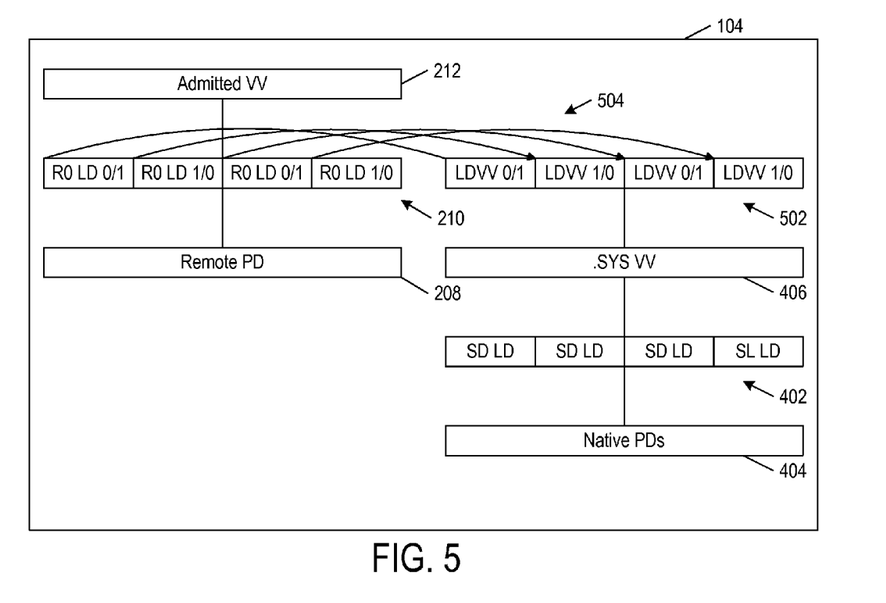
Figure 6:
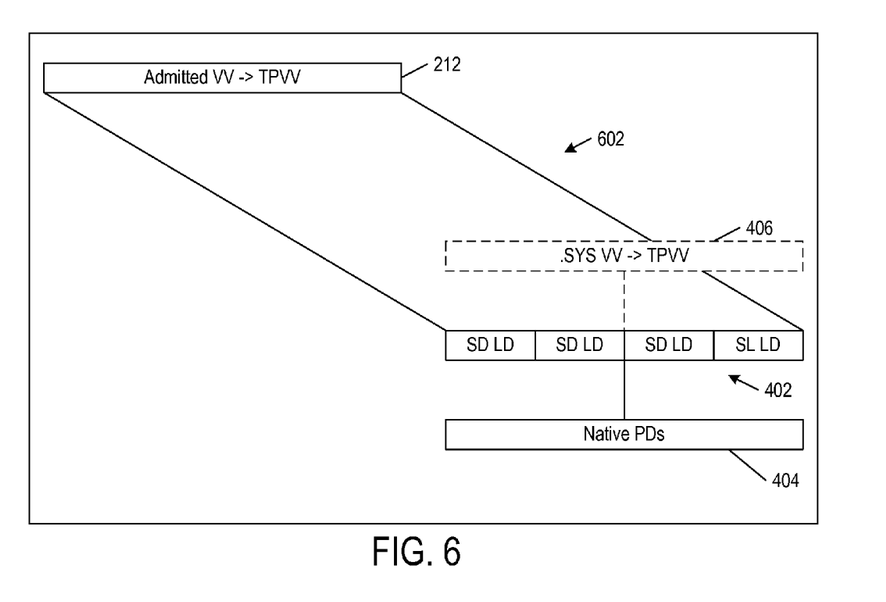

Method 300 is explained with the aid of FIGS. 4, 5, and 6 illustrating the actions of method 300. Method 300 begins in block 302.

In block 302, migration manager 108 creates a set of new LDs 402 (FIG. 4) on destination storage system 104. LDs 402 are mapped to native PDs 404 (FIG. 4) of destination storage system 104. In one example, LDs 402 are snapshot data (SD) LDs because they are mapped to a thinly-provisioned VV (TPVV) to record changes to a base volume. SD LDs 402 are assigned to a set of node pairs to distribute workload and SD LDs 402 may be of any RAID level. Block 302 is followed by block 304.

In block 304, migration manager 108 creates a temporary VV 406 (FIG. 4) on SD LDs 402. Temporary VV 406 has the same attributes as admitted VV 212 (FIG. 4), such as size and cylinder-head-sector (CHS). In one example, temporary VV 406 is a type of TPVV called ".SYSVV" that is different from a normal TPVV in that it cannot be tuned, removed, grown, setvv'ed, exported, snapped, or copied (both physical and remote). Block 304 is followed by block 306.

In block 306, migration manager 108 creates a set of LDs 502 (FIG. 5) on .SYSVV 406. LDs 502 are a type of R0 LDs called "LDVVs" that use VVs instead of PDs for underlying storage. LDVVs 502 are assigned to a set of node pairs to distribute workload and LDVVs 502 are RAID level 0 because they are mapped to a single .SYSVV 406. Block 306 is followed by block 308.

In block 308, migration manager 108 initiates data migration 504 (FIG. 5) of LDs 210 of admitted VV 212 to LDVVs 502 using migration engine 112 on destination storage system 104. Data copied and mirrored to LDVVs 502 are propagated through .SYSVV 406 and down to SD LDs 402. As described above, LD mirroring duplicates any host writes to both locations, ensuring data consistency. .SYSVV 406 performs zero detection in the LD data so that no physical storage space is allocated for the zeroes. Block 308 is followed by block 310 after data migration 504 completes.

In block 310, migration manager 108 blocks host access to admitted VV 212 for a short amount of time (e.g., less than one minute) to VV 212 appears online to host systems. Block 310 is followed by block 312.

In block 312, in one example, migration manager 108 performs a mapping 602 (FIG. 6) of admitted VV 212 to SD LDs 402 and then changes the data structure of admitted VV 212 to the data structure of a normal TPVV to create a normal TPVV 212 (FIG. 6). As admitted or normal VV 212 does not change its WWN or LUN number, it appears online to host systems during method 300. In another example, migration manager 108 replaces admitted VV 212 with .SYSVV 406 by changing the data structure of .SYSVV 406 to the data structure of a normal TPVV, renaming TPVV 406 with the WWN and LUN number of admitted VV 212, and deleting admitted VV 212. In essence, .SYSVV 406 becomes TPVV 212. Block 312 is followed by block 314.

In block 314, migration manager 108 unblocks host access to TPVV 212. Block 314 is followed by optional block 316.

In optional block 316, migration manager 108 deletes any intermediate objects such as R0 LDs 210, .SYSVV 406, and LDVVs 502.

Figure 7:
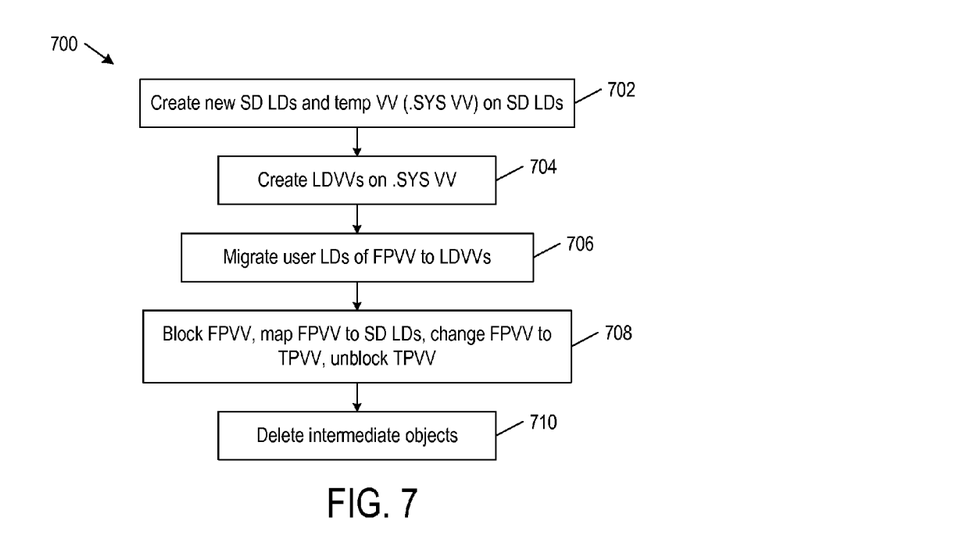
FIG. 7 is a flowchart of a method for converting a fully-provisioned virtual volume (FPVV) to a thinly-provisioned virtual volume (TPVV) online in one example of the present disclosure.

FIG. 7 is a flowchart of a method 700 for converting a FPVV to a TPVV on a storage system (e.g., storage system 104 in FIG. 1) online in one example of the present disclosure. In one example, method 700 is implemented by migration manger 108 (FIG. 1) located on host computer system 110 (FIG. 1) coupled to storage system 104. In another example, migration manager 108 may be located on storage system 104.

Figure 8:
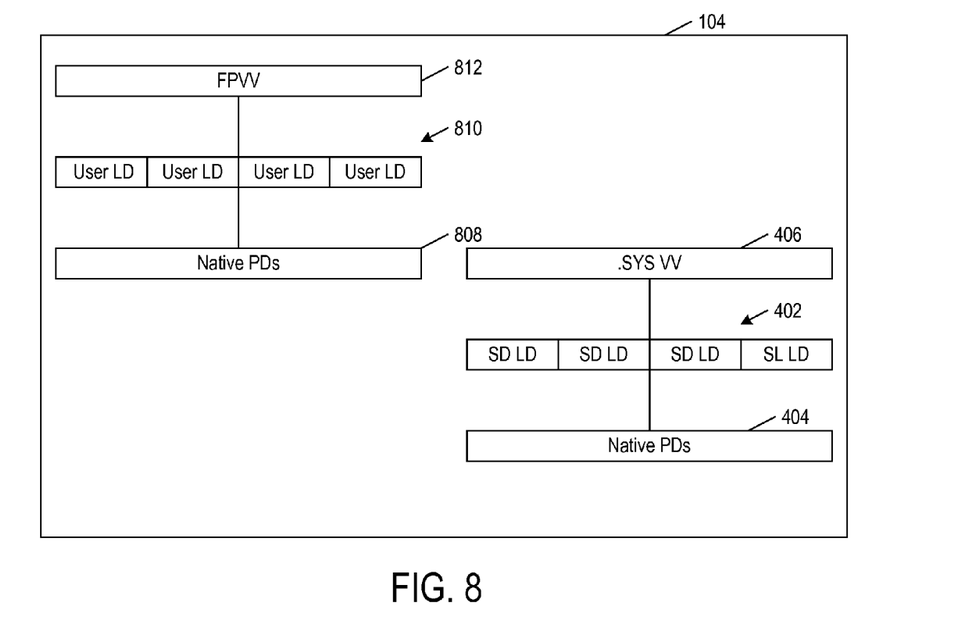
FIGS. 8, 9, and 10 illustrate the actions in the method in FIG. 7 in one example of the present disclosure.
Figure 9:
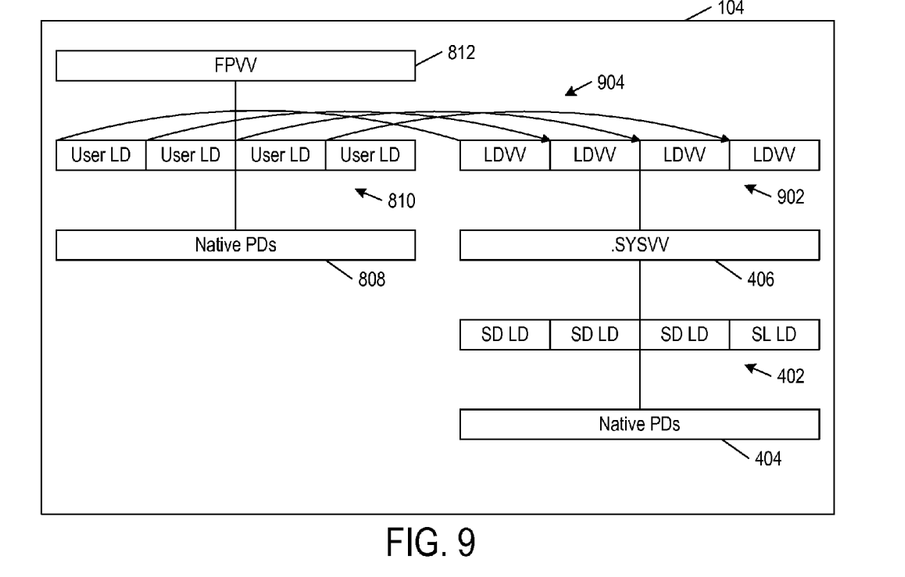
Figure 10:
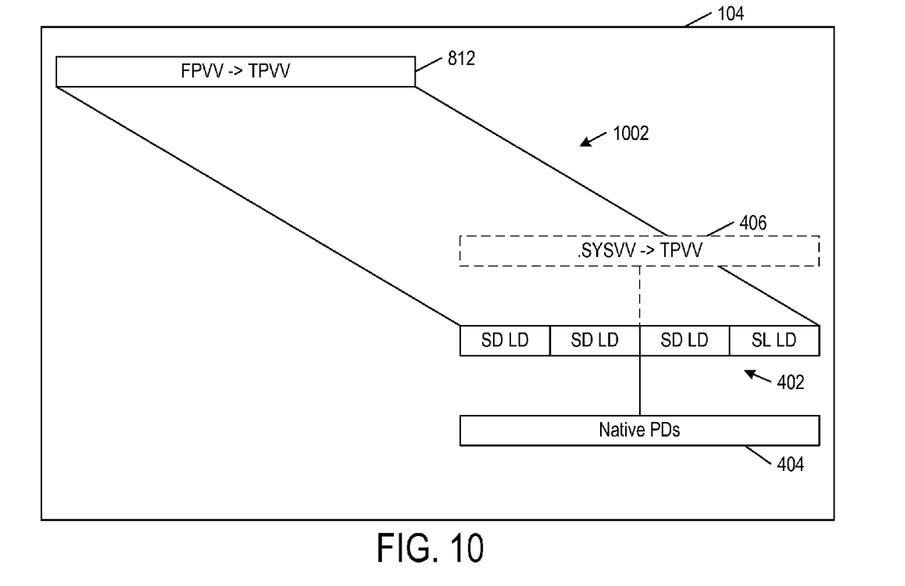

Method 700 is explained with the aid of FIGS. 8, 9, and 10 illustrating the actions of method 700. FIG. 8 illustrates that storage system 104 includes a FPVV 812 that is to be converted to a TPVV. FPVV 812 is mapped to user LDs 810, which are mapped to native PDs 808. User LDs 810 are assigned to a set of node pairs to distribute workload and User LDs 810 may be of any RAID level. Referring back to FIG. 7, method 700 begins in block 702.

In block 702, migration manager 108 creates a set of new SD LDs 402 (FIG. 8) on storage system 104. SD LDs 402 are assigned to a set of node pairs to distribute workload and SD LDs 402 may be of any RAID level. Migration manager 108 then creates .SYSVV 406 (FIG. 8) on SD LDs 402. .SYSVV 406 has the same size as FPVV 812. Block 702 is followed by block 704.

In block 704, migration manager 108 creates LDVVs 902 (FIG. 9) on .SYSVV 406. LDVVs 902 are assigned to a set of node pairs to distribute workload and LDVVs 902 are RAID level 0. Block 704 is followed by block 706.

In block 706, migration manager 108 initiates data migration 904 (FIG. 9) from user LDs 810 of FPVV 812 to LDVVs 902 using migration engine 112 (FIG. 1) on storage system 104. Data copied and mirrored to LDVVs 902 are propagated through .SYSVV 406 down to SD LDs 402. As described above, LD mirroring ensures data consistency and .SYSVV 406 does not allocate physical storage space zero data. Block 706 is followed by block 708 after data migration 904 completes.

In block 708, migration manager 108 blocks host access to FPVV 812 for a short amount of time (e.g., less than one minute) so FPVV 812 appears online to host systems. In one example, migration manager 108 next performs a mapping 1002 (FIG. 10) of FPVV 812 to SD LDs 402 and changes the data structure of FPVV 812 to a data structure of a TPVV to create a TPVV 812. As VV 812 does not change its WWN or LUN number, it appears online to host systems during method 300. In another example, migration manager 108 replaces FPVV 812 with .SYSVV 406 by changing the data structure of .SYSVV 406 to the data structure of a normal TPVV, renaming TPVV 406 with the WWN and LUN number of FPVV 812, and deleting FPVV 812. In essence, .SYSVV 406 becomes TPVV 812. Migration manager 108 then unblocks host access to TPVV 812. Block 708 is followed by optional block 710.

In optional block 710, migration manager 108 deletes any intermediate objects such as .SYSVV 406, user LDs 810, and LDVVs 902.

Figure 11:
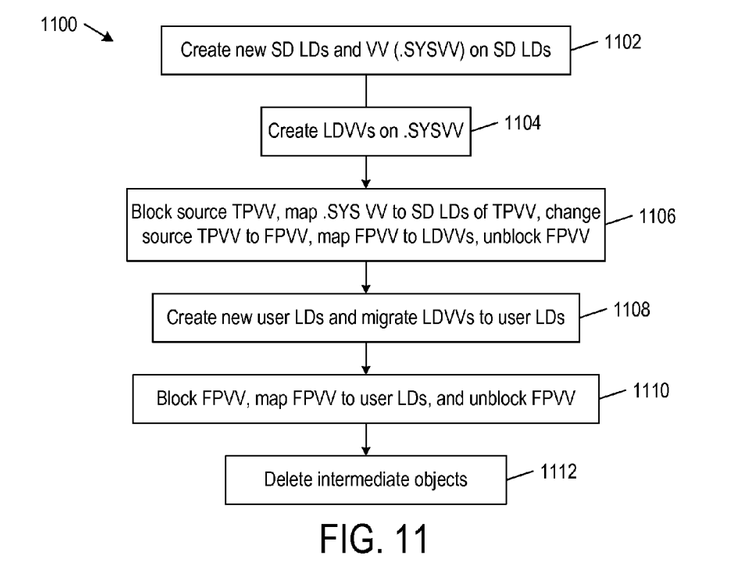
FIG. 11 is a flowchart of a method for converting a TPVV to FPVV online in one example of the present disclosure.

FIG. 11 is a flowchart of a method 1100 for converting a TPVV to a FPVV on a storage system (e.g., storage system 104 in FIG. 1) online in one example of the present disclosure. In one example, method 1100 is implemented by migration manger 108 (FIG. 1) located on host computer system 110 (FIG. 1) coupled to storage system 104. In another example, migration manager 108 may be located on storage system 104.

Figure 12:
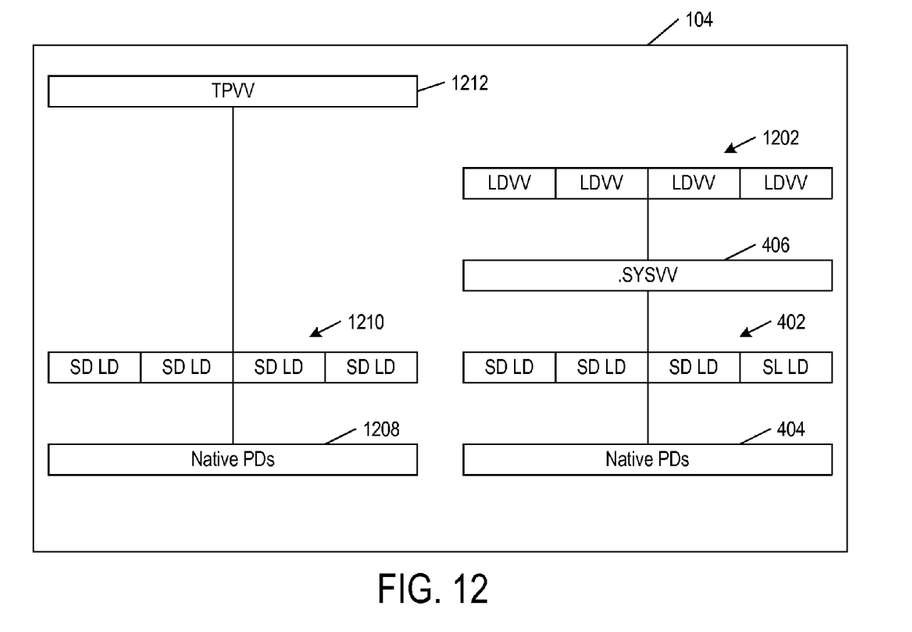
FIGS. 12, 13, 14, and 15 illustrate the actions in the method in FIG. 11 in one example of the present disclosure.
Figure 13:
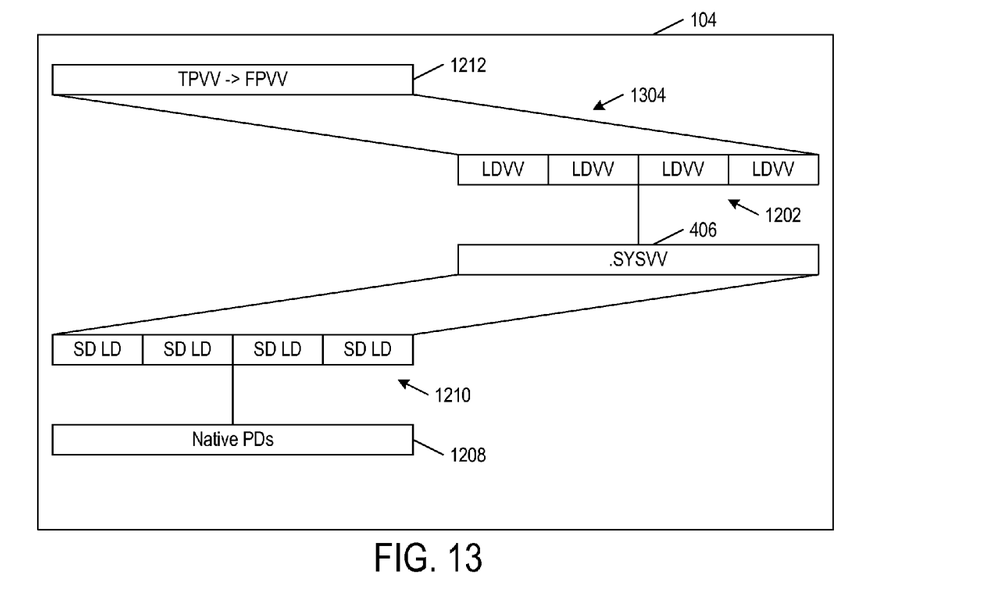
Figure 14:
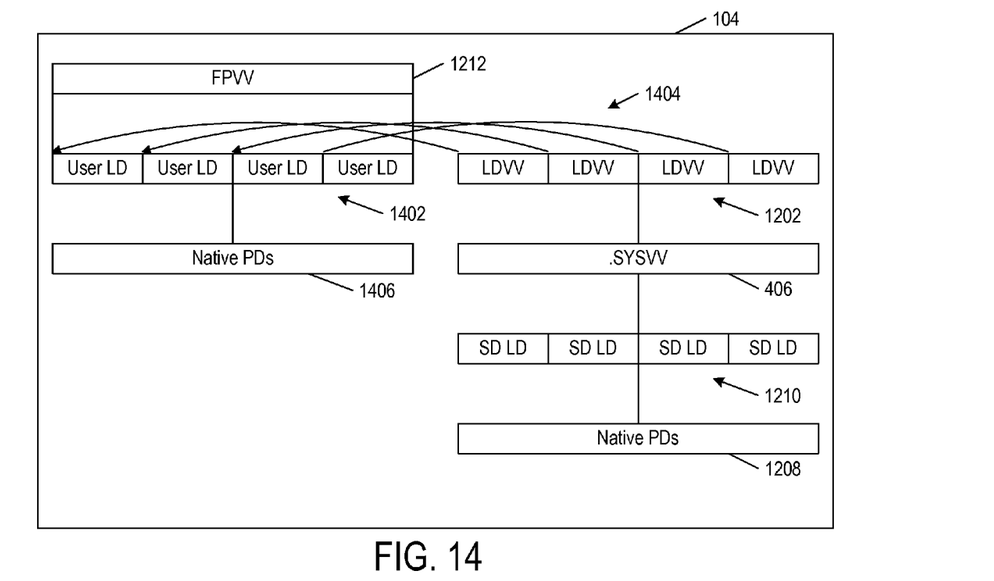

Method 1100 is explained with the aid of FIGS. 12, 13, 14, and 15 illustrating the actions of method 1100. FIG. 12 illustrates that storage system 104 includes a TPVV 1212 that is to be converted to a FPVV. TPVV 1212 is mapped to SD LDs 1210, which are mapped to native PDs 1208. SD LDs 1210 are assigned to a set of node pairs to distribute workload and SD LDs 1210 may be of any RAID level. Referring back to FIG. 11, method 1100 begins in block 1102.

In block 1102, migration manager 108 creates a set of new SD LDs 402 (FIG. 12) on storage system 104. Migration manager 108 then creates .SYSVV 406 (FIG. 12) on SD LDs 402. .SYSVV 406 has the same attributes as TPVV 1212, such as size and CHS. Block 1102 is followed by block 1104.

In block 1104, migration manager 108 creates LDVVs 1202 (FIG. 12) on .SYSVV 406. LDVVs 1202 are assigned to a set of node pairs to distribute workload and LDVVs 1202 may be of any RAID level. Block 1104 is followed by block 1106.

In block 1106, migration manager 108 blocks host access to TPVV 1212 for a short amount of time (e.g., less than one minute) so TPVV 1212 appears online to host systems. Migration manager 108 then performs a mapping 1302 (FIG. 13) of .SYSVV 406 to SD LDs 1210, changes the data structure of TPVV 1212 to the data structure of a FPVV to create a FPVV 1212, and performs a mapping 1304 (FIG. 13) of FPVV 1212 to LDVV 1202. Migration manager 108 then unblocks host access to FPVV 1212. Block 1106 is followed by block 1108.

In block 1108, migration manager 108 creates new user LDs 1402 (FIG. 14) and initiates data migration 1404 (FIG. 14) from LDVV 1202 to user LDs 1402 using migration engine 112 (FIG. 1) on storage system 104. User LDs 1402 are assigned to a set of node pairs to distribute workload and user LDs 1402 may be of any RAID level. As described above, LD mirroring duplicates any host writes to both locations, ensuring data consistency. Block 1108 is followed by block 1110 after data migration 1404 completes.

Figure 15:
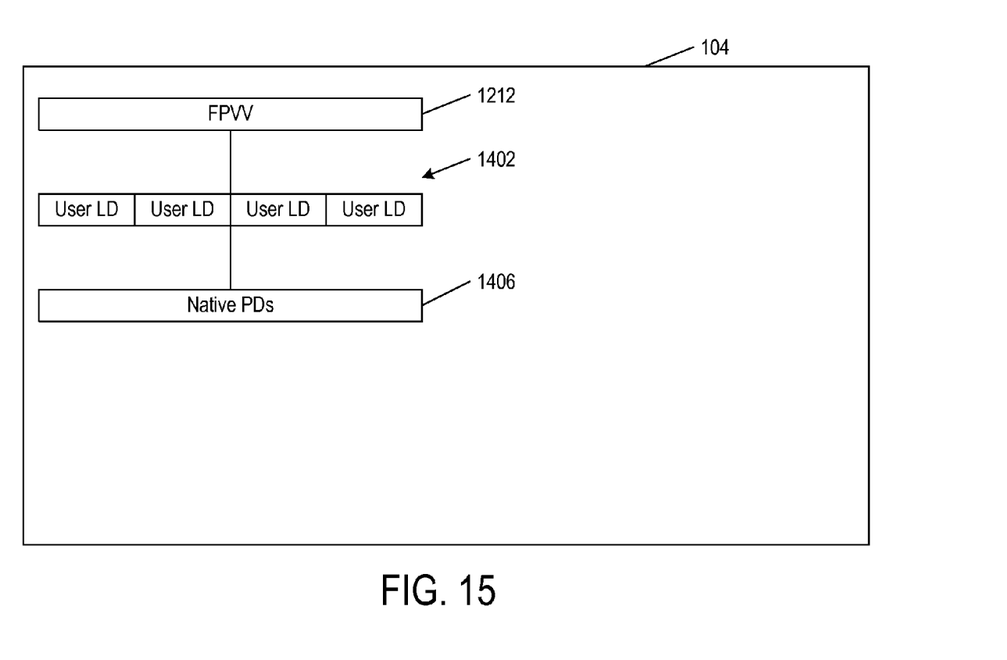

In block 1110, migration manager 108 blocks host access to FPVV 1212 for a short amount of time (e.g., less than one minute) so FPVV 1212 appears online to host systems. Migration manager 108 then maps FPVV 1212 to user LDs 1402 and unblocks host access to FPVV 1212. Block 1110 is followed by optional block 1112.

In optional block 1112, migration manager 108 deletes any intermediate objects such as .SYSVV 406, user LDs 1210, and LDVVs 1202.

Various other adaptations and combinations of features of the embodiments disclosed are within the scope of the invention. Numerous embodiments are encompassed by the following claims.

What is claimed is:

1. A method, comprising:
    in response to a requirement for a data migration from a first plurality of logical disks (LDs) in a storage system:
        generating a second plurality of LDs in the storage system;
        generating a temporary virtual volume (VV) mapped to the second plurality of LDs;
        generating a third plurality of LDs mapped to the temporary VV; and
        migrating all data from the first plurality of LDs to the third plurality of LDs.

2. The method of claim 1, further comprising:
    generating a physical disk virtual volume (PDVV) in the storage system, wherein the PDVV is associated with a VV from another storage system;
    mapping the first plurality of LDs to the PDVV; and
    generating, in the storage system, an admitted VV mapped to the first plurality of LDs.

3. The method of claim 2, further comprising:
    blocking host access to the admitted VV;
    mapping the admitted VV to the second plurality of LDs;
    changing the admitted VV to a thinly-provisioned VV (TPVV), the TPVV retaining a world wide name (WWN) and a logical unit number (LUN) of the admitted VV; and
    unblocking host access to the TPVV.

4. The method of claim 2, further comprising:
    blocking host access to the admitted VV;
    replacing the admitted VV with the temporary VV by renaming the temporary VV with the WWN and the LUN of the admitted VV and changing the temporary VV to a TPVV; and
    unblocking host access to the TPVV.

5. The method of claim 1, wherein the storage system includes a fully-provisioned VV (FPVV), the FPVV is mapped to the first plurality of LDs, and the first plurality of LDs is mapped to physical storage space in the storage system.

6. The method of claim 5, further comprising:
    blocking host access to the FPVV;
    mapping the FPVV to the second plurality of LDs;
    changing the FPVV to a TPVV, the TPVV retaining a WWN and a LUN of the FPVV; and
    unblocking host access to the TPVV.

7. The method of claim 1, wherein the storage system includes a TPVV, the TPVV is mapped to a fourth plurality of LDs, and the fourth plurality of LDs is mapped to physical storage space in the storage system.

8. The method of claim 7, further comprising:
    blocking host access to the TPVV;
    mapping the temporary VV to the fourth plurality of LDs;
    changing the TPVV to a FPVV, the FPVV retaining a WWN and a LUN of the TPVV, wherein the storage system has enough space to accommodate the FPVV;
    mapping the FPVV to the third plurality of LDs; and
    unblocking host access to the FPVV.

9. The method of claim 1, wherein the first plurality of LDs comprises Redundant Array of Independent Disk (RAID) level 0 LDs.

10. The method of claim 8, further comprising:
    blocking the FPVV;
    mapping the FPVV to the first plurality of LDs; and
    unblocking the FPVV.

11. A non-transitory computer readable medium encoded with executable instructions for execution by a processor to:
    in response to a requirement for a data migration from a first plurality of logical disks (LDs) in a storage system:
        generate a second plurality of LDs in the storage system;
        generate a temporary virtual volume (VV) mapped to the second plurality of LDs;
        generate a third plurality of LDs mapped to the temporary VV; and
        migrate all data from the first plurality of LDs to the third plurality of LDs.

12. The medium of claim 11, wherein the instructions for execution by a processor to:
    generate a physical disk virtual volume (PDVV) in the storage system, wherein the PDVV is associated with a VV from another storage system;
    map the first plurality of LDs to the PDVV;
    generate, in the storage system, an admitted VV mapped to the first plurality of LDs;
    block host access to the admitted VV;
    map the admitted VV to the second plurality of LDs;

change the admitted VV to a thinly-provisioned VV (TPVV), the TPVV retaining a world wide name (WWN) and a logical unit number (LUN) of the admitted VV; and unblock host access to the TPVV.

13. The medium of claim 11, wherein the storage system includes a fully-provisioned VV (FPVV) to be converted to a TPVV, the FPVV is mapped to the third plurality of LDs, the first plurality of LDs is mapped to physical storage space in the storage system, and the instructions for execution by a processor to:

block host access to the FPVV;
map the FPVV to the second plurality of LDs;
change the FPVV to a TPVV, the TPVV retaining a WWN and a LUN of the FPVV;
unblock host access to the TPVV.

14. The medium of claim 11, wherein the storage system includes a TPVV, the TPVV is mapped to a fourth plurality of LDs, the fourth plurality of LDs is mapped to physical storage space in the storage system, and the instructions for execution by a processor to:

block host access to the TPVV;
map the temporary VV to the fourth plurality of LDs;
change the TPVV to a FPVV, the FPVV retaining a WWN and a LUN of the TPVV, wherein the storage system has enough space to accommodate the FPVV;
map the FPVV to the third plurality of LDs; and
unblock host access to the FPVV.

15. A storage system federation, comprising:

a storage system;
a migration manager to, in response to a requirement for a data migration from a first plurality of logical disks (LDs) in the storage system:
generate a second plurality of LDs in the storage system;
generate a temporary virtual volume (VV) in the storage system mapped to the second plurality of LDs;
generate a third plurality of LDs in the storage system mapped to the temporary VV; and
migrate all data from the first plurality of LDs to the third plurality of LDs in the storage system.

16. The storage system federation of claim 15, wherein the migration manager is further to, in response to the requirement for the data migration from the first plurality of LDs in the storage system:

generate a physical disk virtual volume (PDVV) in the storage system, wherein the PDVV is associated with a VV from another storage system;
map the first plurality of LDs to the PDVV; and
generate, in the storage system, an admitted VV mapped to the first plurality of LDs.

17. The storage system federation of claim 16, wherein the migration manager is further to, in response to the requirement for the data migration from the first plurality of LDs in the storage system:

block host access to the admitted VV;
map the admitted VV to the second plurality of LDs;
change the admitted VV to a thinly-provisioned VV (TPVV), the TPVV retaining a world wide name (WWN) and a logical unit number (LUN) of the admitted VV; and
unblock host access to the TPVV.

18. The storage system federation of claim 16, wherein the migration manager is further to, in response to the requirement for the data migration from the first plurality of LDs in the storage system:

block host access to the admitted VV;
replace the admitted VV with the temporary VV by renaming the temporary VV with the WWN and the LUN of the admitted VV and changing the temporary VV to a TPVV; and
unblock host access to the TPVV.

19. The storage system federation of claim 15, wherein the storage system includes a fully-provisioned VV (FPVV), the FPVV is mapped to the third plurality of LDs, the first plurality of LDs is mapped to physical storage space in the storage system, and the migration manager is further to:

block host access to the FPVV;
map the FPVV to the second plurality of LDs;
change the FPVV to a TPVV, the TPVV retaining a WWN and a LUN of the FPVV;
unblock host access to the TPVV.

20. The storage system federation of claim 15, wherein the storage system includes a TPVV, the TPVV is mapped to a fourth plurality of LDs, the fourth plurality of LDs is mapped to physical storage space in the storage system, and the instructions for execution by a processor to:

block host access to the TPVV;
map the temporary VV to the fourth plurality of LDs;
change the TPVV to a FPVV, the FPVV retaining a WWN and a LUN of the TPVV, wherein the storage system has enough space to accommodate the FPVV;
map the FPVV to the third plurality of LDs; and
unblock host access to the FPVV.

* * * * *